United States Patent [19]

Capuani

[11] Patent Number: 4,478,378
[45] Date of Patent: Oct. 23, 1984

[54] AIRCRAFT WITH JET PROPULSION

[75] Inventor: Alfredo Capuani, Torino, Italy

[73] Assignee: Aeritalia-Societa Aerospaziale Italiana-per Azioni, Turin, Italy

[21] Appl. No.: 434,073

[22] Filed: Oct. 12, 1982

[30] Foreign Application Priority Data

Oct. 15, 1981 [IT] Italy .............................. 68334 A/81
Mar. 30, 1982 [IT] Italy .............................. 67415 A/82

[51] Int. Cl.³ ...................... B64C 21/04; B64D 27/18
[52] U.S. Cl. .................................. 244/12.5; 244/207; 244/55; 244/91
[58] Field of Search .................... 244/12.1, 12.4, 12.5, 244/15, 91, 23 D, 207, 36, 55, 212, 82, 80, 214; D12/331, 332, 333, 342, 343

[56] References Cited

U.S. PATENT DOCUMENTS

| | | | |
|---|---|---|---|
| 2,001,607 | 5/1935 | Gianoli | 244/82 |
| 2,428,194 | 9/1947 | Bockrath | 244/82 |
| 2,541,922 | 2/1951 | Hosford | 244/82 |
| 3,026,067 | 3/1962 | Grant | 244/91 |
| 3,051,413 | 8/1962 | Pouit | 244/12.5 |
| 3,756,542 | 9/1973 | Bertin | 244/15 |
| 3,884,432 | 5/1975 | Blanchard et al. | 244/55 |
| 3,938,760 | 2/1976 | Hoppner et al. | 244/12.5 |
| 4,099,691 | 7/1978 | Swanson et al. | 244/214 |
| 4,398,683 | 8/1983 | Schmetzer | 244/12.5 |

FOREIGN PATENT DOCUMENTS

| | | | |
|---|---|---|---|
| 1164671 | 10/1958 | France | 244/12.1 |
| 1178843 | 5/1959 | France | 244/12.1 |
| 2083420 | 3/1982 | United Kingdom | 244/55 |

Primary Examiner—Galen L. Barefoot
Attorney, Agent, or Firm—Sughrue, Mion, Zinn, Macpeak & Seas

[57] ABSTRACT

A jet propelled aircraft of the kind in which propulsion jets are directed over the top surface of the wing so as to cause additional lift as a result of the supercirculation induced on the wing and the deflection of the jets downwards, due to the Coanda effect, immediately downstream of the wing is provided with two longitudinal surfaces projecting from said top surface so as to form a single surface ejector system. The wing of the aircraft has a fixed front part which occupies a minor portion of the wing chord, and a movable rear portion which is articulated to the fixed portion about a substantially transverse axis and can be inclined downwards relative to the fixed part. The portion of the wing between the two longitudinal surfaces may be provided on its trailing edge with a movable attitude control surface of the aircraft. The aircraft may also include a sensor to detect variations in the relative air flow direction in a determined flight attitude, and an actuator to control the movable control surface as a function of the output signal of the sensor in such a manner as to maintain unchanged the attitude of the aircraft.

13 Claims, 14 Drawing Figures

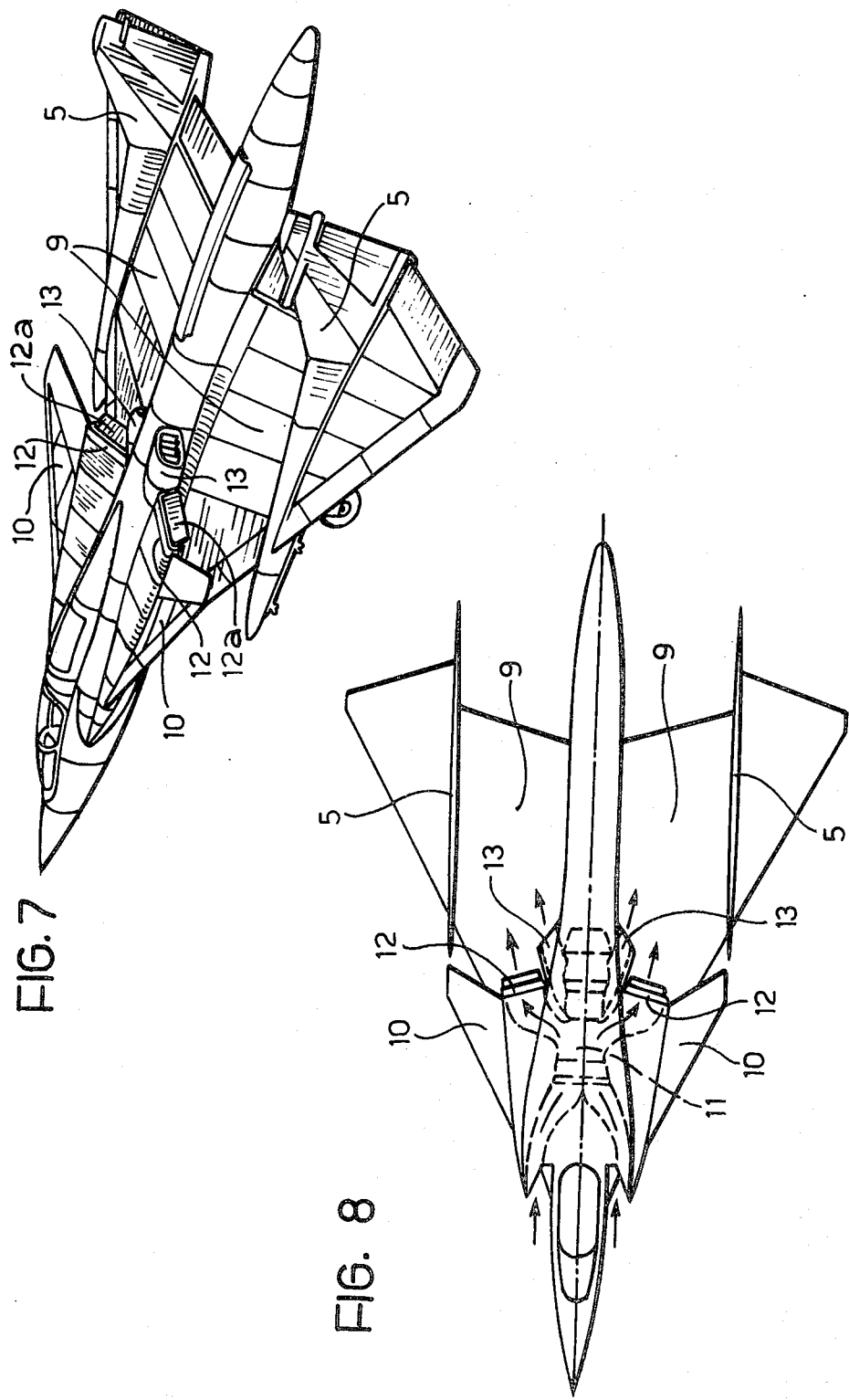

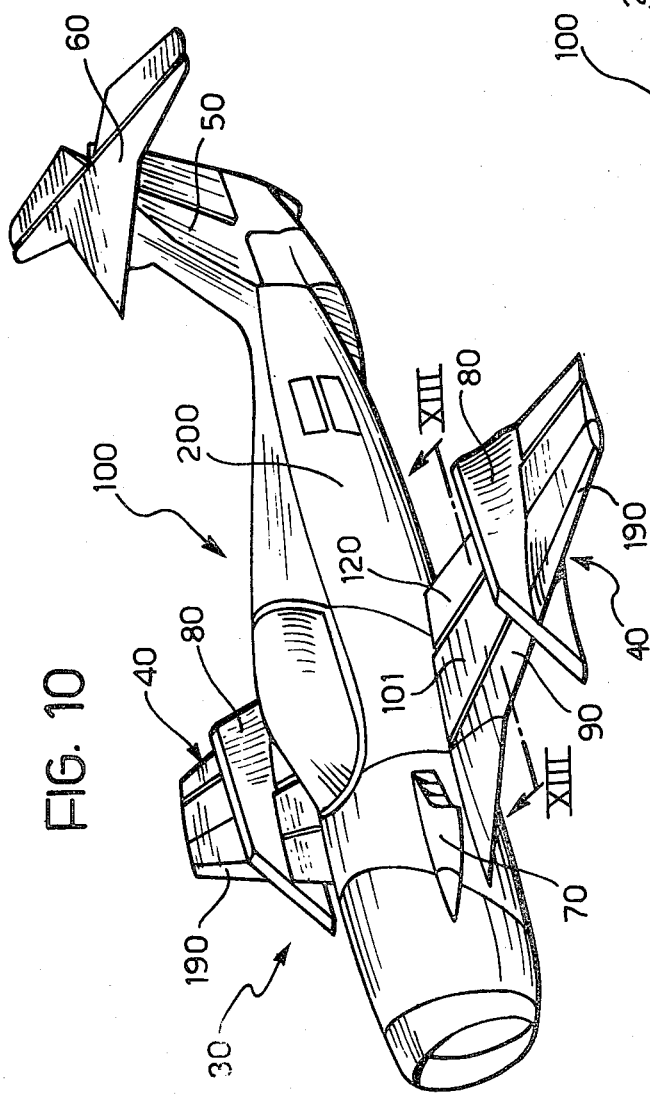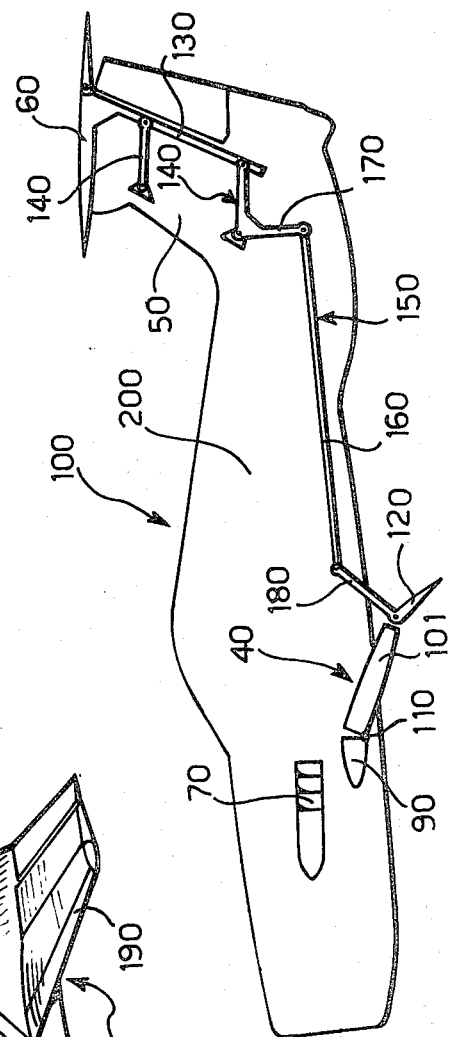
FIG. 10
FIG. 11

AIRCRAFT WITH JET PROPULSION

The present invention provides a jet propelled aircraft of the kind having propulsion jets directed over the top surface of the wing so as to give rise to an additional lift as a result of supercirculation produced on the wing and of downward deflection of the jets which occurs by the Coanda effect immediately downstream of the wing.

On example of an aircraft of the type specified above is described and illustrated in the technical publication Agard CP-262 "Aerodynamic characteristic of control", section 8 "The YC-14 upper surface blown flap: a unique control surface".

The aircraft illustrated in the said technical publication has each propulsion unit placed above the wing according to a configuration known as "engine over-the-wing" by technicians in the field. Thanks to this characteristic, the jets of the propulsion systems are directed over the top surface of the wing, producing a supercirculation on the wing and inducing, consequently, a substantial lift increase. Moreover, due to a phenomenon known as the Coanda effect, the jets which are directed over the top surface of the wing tend to follow the curvature of the latter and are deflected downwards immediately downstream of the wing so as to obtain a further increase in lift substantially equal to the thrust of the deflected jets.

The object of the present invention is to provide an aircraft of the kind specified above which has further improved lift characteristics.

The main characteristic of the aircraft according to the present invention resides in the fact that the area of the top surface of the wing which the jets are directed is defined laterally by two longitudinal surfaces projecting from the top surface of the wing, so as to form a single surface ejector system in which the primary fluid consists of jets, the secondary fluid consists of the relative air flow over the wing and in which the successive zones of expansion, mixing and recompression of the ejector are defined by a single active surface, consisting of the top surface of the wing.

Thanks to the aforesaid characteristic, it is possible to obtain an increase in the thrust of the jets which is transformed into a combined increase in lift and propulsion.

According to a first solution the propulsion jets are directed so as to impinge on the top surface of the wing so that they assume a flattened and broadened form above the top surface of the wing, due to contact with the latter. In an alternative solution, the propulsion jets are directed so as not to impinge upon the top surface of the wing. In this case the discharge nozzles from which the jets emerge have a flattened and widened shape, so as to give the jets a corresponding configuration.

A further preferred characteristic resides in the fact that the nozzles from which the jets emerge are provided with means for generating vorticity in the said jets, so as to ensure mixing between the jets and the relative air flow over the wing.

In a first embodiment, the aircraft according to the invention has a conventional form with a single fuselage and two main planes. In this case at least two propulsion jets are provided at the sides of the fuselage, each one above its respective main plane and the two said longitudinal surfaces are provided respectively by the two main planes and are substantially parallel to the longitudinal plane of symmetry of the aircraft.

In a second embodiment, the aircraft according to the invention has a configuration with double fuselage and wing, including a central section which interconnects the two fuselages. In this case the jets are directed over the said central section of the wing and the said longitudinal surfaces are constituted by the two fuselages.

Preferably, in the aforesaid first embodiment, each of the longitudinal surfaces is situated at a point on the respective main plane, intermediate between the fuselage and the free end of the main plane; this point is so chosen as to bring into longitudinal coincidence the centre of pressure of the whole main plane and the centre of pressure of the portion of main plane included between the fuselage and the longitudinal surface.

Thanks to this characteristic pitching moments which result from variations in thrust are minimised.

A further characteristic of the said first embodiment resides in the fact that the aircraft has a main delta wing and a secondary wing of the canard type placed in front of the main wing, and in that the nozzles from which the jets emerge are placed in correspondence with the trailing edge of the secondary wing and are provided with means for varying the direction of the jets.

Thanks to this characteristic the jets which are used to produce supercirculation on the main wing, are also used to achieve a "blown flap" system on the secondary wing. Variation in the direction of these jets does not induce substantial variation of the overall lift, whilst it allows control of the lift of the secondary wing.

In the aircraft according to the invention, achieving an ejector arrangement makes it possible to obtain an increase in the thrust of the jets which converts into a combined increment of lift and propulsion. The increase in the jet thrust products an increase both of the lift component due to the effect of supercirculation on the wing, and the lift component due to the downward deflection of the jets which results from the Coanda effect immediately downstream of the wing. Upon increase of the thrust of the jets, the lift component due to the downward deflection of the jets becomes preponderant in relation to the lift component due to the supercirculation effect. Moreover, the portion of the aerodynamic field which is affected by the deflected jet is concentrated within an area adjacent the trailing edge of the wing. This affords the possibility of controlling the trim of the aircraft, by orienting the zone of the wing surface adjacent to the trailing edge of the wing, with the object of obtaining a corresponding direction of the deflected jet and hence the lift arising from it.

This possibility is made use of in a further embodiment of the aircraft according to the invention, the main characteristic of which resides in the fact that the wing of the aircraft has a fixed front portion which occupies a lesser portion of the wing chord, and a movable rear portion which occupies a greater portion of the wing chord, and which is articulated to the fixed part about a substantially transverse axis and which can be inclined downward in relation to this fixed part; in that the portion of wing between the said longitudinal surfaces is provided at its trailing edge with a movable surface for controlling the trim of the aircraft, and in that the said aircraft moreover includes sensor means adapted to detect variations in the direction of the relative wind in a determined flight trim, and actuator means adapted to move the said movable control surface in dependence on the output signal from the sensor means in such manner as to maintain unchanged the trim of the aircraft.

According to a further preferred characteristic, the said sensor means consist of a movable auxiliary surface. Preferably, moreover, the movable auxiliary surface is connected to the said movable control surface by means of a mechanical transmission whereby it also acts as an actuator of the movable control surface.

Preferably the movable auxiliary surface consists of the horizontal tailplane of the aircraft, which is adapted to move vertically.

Further characteristics and advantages of the present invention will emerge from the following description with reference to the accompanying drawings, supplied purely by way of non-restrictive example, in which:

FIG. 7 is a perspective view of a first embodiment of the aircraft according to the invention, FIG. 8 is a diagrammatic plan view of the aircraft in FIG. 7;

FIG. 10 is a diagrammatic perspective view of a third embodiment of the aircraft according to the invention;

FIG. 11 is a diagrammatic side elevational view of the aircraft in FIG. 10; and

Figure 1:
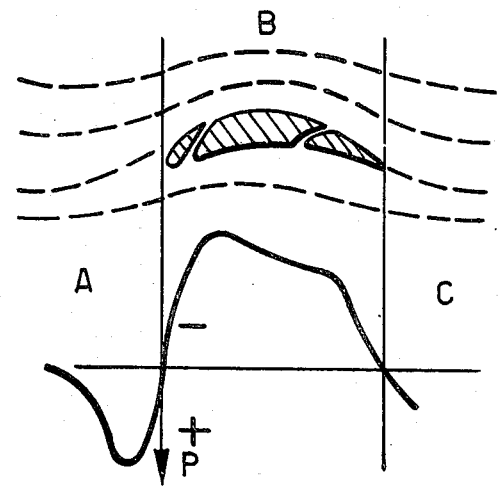
FIGS. 1 to 6 illustrate diagrammatically the principle of operation of the aircraft according to the invention.
Figure 2:
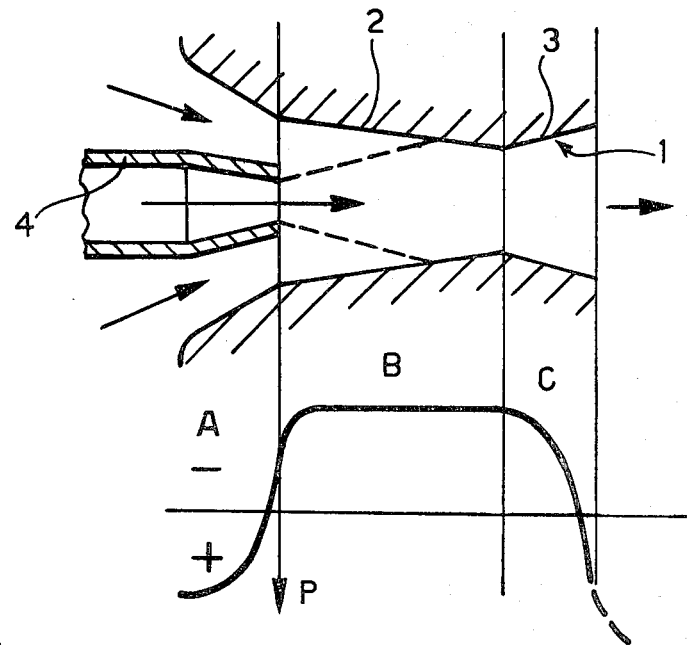

FIGS. 1 and 2 of the accompanying drawings illustrate the analogy which exists between the aerodynamic field of a wing and that of an ejector. More particularly, FIG. 1 illustrates diagrammatically in its upper portion the aerodynamic field of a wing, and in its lower portion the relative variation of the pressure. The aerodynamic field includes a stagnation zone, indicated A, upstream of the wing, a high speed zone, indicated B, above the top surface of the wing, and a recompression zone indicated C, downstream of the wing. FIG. 2 illustrates diagrammatically in its upper portion an ejector comprising a pipe 1 having a converging section 2 and a diverging section 3, and a nozzle 4 located within the converging section 2 of the pipe 1. According to the known principle of operation of the ejector, the kinetic energy possessed by a jet of fluid (primary fluid) emerging from the nozzle 4 is partially transferred, essentially by mixing, to a flow of another fluid (secondary fluid) coming from the input of the converging section 2. The kinetic energy prossessed by the flow resulting from the mixing of the two fluids is converted into pressure energy in the diffuser 3, so that at the outlet of the ejector the mixture will be at a pressure higher than that of the atmosphere from which the secondary fluid is drawn. A,B, and C indicate respectively the expansion zone, the mixing zone, and the recompression zone of the ejector.

Comparison between FIGS. 1 and 2 makes clear the analogy existing between the aerodynamic field of a wing and that of the ejector.

This analogy affords the theoretical possibility of providing an ejector system in correspondence with the top surface of the wing of a jet propelled aircraft, by directing the propulsion jet over the top surface of the wing so as to achieve a single surface ejector in which the primary fluid consists of the propulsion jets, the secondary fluid consists of the relative air stream over the wing, and in which the zone of expansion, mixing, and recompression of the ejector are defined by a single active surface consisting of the top surface of the wing.

Figure 3:
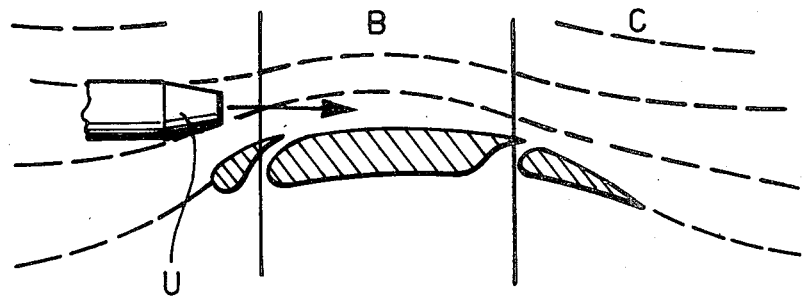

FIG. 3 illustrates diagrammatically the application of the principle of the ejector to a wing of an aircraft with jet propulsion. Shown at U is the nozzle from which the propulsion jet emerges, and at B is shown the mixing zone between the jet and the relative air flow over the wing.

The advantage of this application of the principle of the ejector is that of producing a substantial increase in thrust which converts into a combined increase of both lift and thrust.

Studies and experiments carried out by the Applicant have demonstrated that the main problem to be resolved in order to achieve in practice the single surface ejector system described above in correspondence with the top wing surface of an aircraft with jet propulsion lies in achieving efficient mixing between the jet (primary fluid) and the relative air flow over the wing (secondary fluid) in correspondence with the high speed zone of the aerodynamic field, that is, in the zone immediately adjacent the top surface of the wing.

This problem is resolved in the aircraft according to the present invention due both to the fact that the area of the top surface of the wing over which the jets are directed is delimited laterally by two longitudinal surfaces projecting from the said top surface. The aforesaid mixing is moreover facilitated by the fact that the propulsion jets have a flattened and widened configuration above the top surface of the wing.

Figure 4:
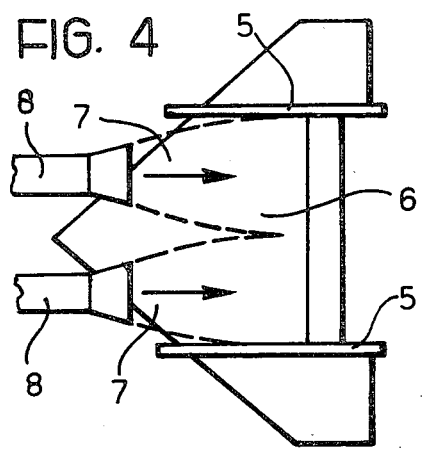

FIG. 4 illustrates diagrammatically the plan view of the wing of an aircraft according to the invention, in the embodiment which will be described in detail later with reference to FIGS. 7 and 8. The two said longitudinal surfaces (indicated by the reference numeral 5) delimit a central area 6 over which the jets 7 emerging from two nozzles 8 are directed.

The flattened and widened configuration of each jet 7 over the top surface of the wing can be produced either by directing the jet against the top surface of the wing, so as to make it assume the said configuration following contact with the top surface of the wing, or prearranging discharge nozzles having a flattened and widened configuration so as to impart a corresponding configuration to the jets.

Experiments carried out by the Applicant have shown that using the two longitudinal surfaces 5 makes it possible to produce high increases of thrust, to the combined advantage of both lift and propulsion. It is understood that this phenomenon is due to the fact that the longitudinal surfaces 5 prevent parasitical transverse flows being drawn into the centre area of the wing by the high pressure drop existing there.

Referring to FIGS. 7 and 8, the said first embodiment of the aircraft according to the invention has a main delta wing made up of two main planes 9 from which the longitudinal surfaces 5 project and a secondary canard wing 10 located in front of the main wing. In FIG. 8, there is shown diagrammatically, by a dashed line, the propulsion unit 11 of the aircraft, provided with a first pair of discharge nozzles 12 and a second pair of discharge nozzles 13 situated rearwardly of the first pair of nozzles 12. The nozzles 12 are placed in correspondence with the trailing edge of the secondary wing 10 and are provided with flaps 12a for effecting variation in the direction of the jets.

Figure 6:
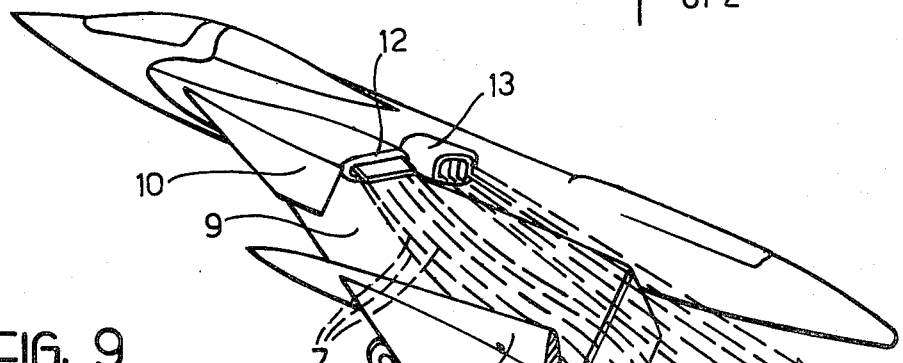

By virtue of the said characteristic the jets emerging from the nozzles 12, apart from being used to induce a supercirculation in that area of the main wing included between the two longitudinal surfaces 5, are also used for providing the secondary wing 10 with a "blown flap" system. Variation in the direction of the jets emerging from the nozzles 12 allows on the one hand control of the lift of the secondary wing 10 and on the other hand does not induce substantial changes in the overall lift. FIG. 6 shows diagrammatically the path of the jets in the aircraft in FIGS. 7 and 8. As illustrated, the jet directed over the main wing 9 is deflected downwards, by the Coanda effect, immediately downstream of this wing so as to produce an increase of lift equal to the magnitude of the thrust of the deflected jet.

In order to improve further the mixing between the jets and the relative air flow over the wing, the nozzles from which the jets emerge should preferably be provided with means for increasing the vorticity of the said jets.

Figure 5:
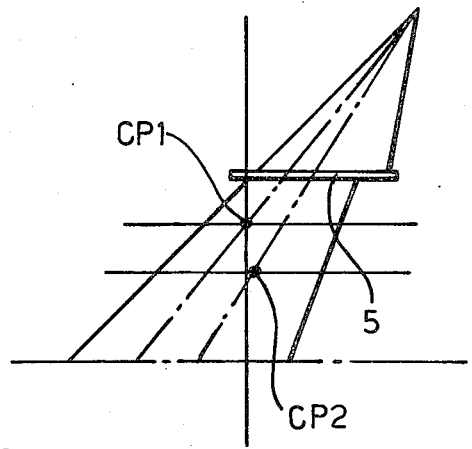

In FIG. 5, CP1 and CP2 indicate respectively the centre of pressure of the portion of the main plane between the fuselage and the longitudinal surface 5. This surface extends into an intermediate area of the main plane so chosen that the two points CP1, CP2 substantially coincide with each other relative to the longitudinal direction of the aircraft.

Figure 9:
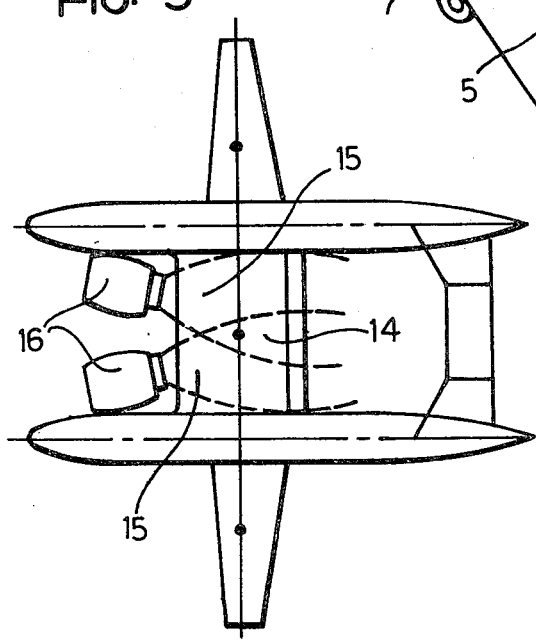
FIG. 9 is a diagrammatic plan view of a second embodiment of the aircraft according to the invention.

FIG. 9 illustrates a second embodiment of the aircraft according to the invention, having a twin fuselage configuration, in which the wing includes a centre section 14 which unites the two fuselages over which the jets 15 of the two propulsion units 16 are directed. In this case the longitudinal surfaces which delimit laterally the area of supercirculation consist of the twin fuselages of the aircraft.

The jets 15 converge in the central part of the wing, so as to allow the rolling moments which occur in the case of flight with a single engine to be minimised.

The embodiment of the aircraft according to the invention illustrated in FIG. 10 is indicated by reference numeral 100 and comprises a fuselage 200, a wing 30 consisting of two main planes 40 and a T-section tail including a vertical fin 50 and a horizontal tailplane 60.

The propulsion jets of the aircraft emerge from two nozzles 70 (only one of which is illustrated in FIGS. 10 and 11) placed at the sides of the fuselage in the zone in front of the wing 30. Each main plane 40 is moreover provided with a longitudinal surface 80, projecting from the top surface of the wing, which makes it possible to achieve, in the area between itself and the fuselage, a single surface ejector arrangement in a similar manner to that provided in the embodiments illustrated in FIGS. 4 to 9.

Figure 13:
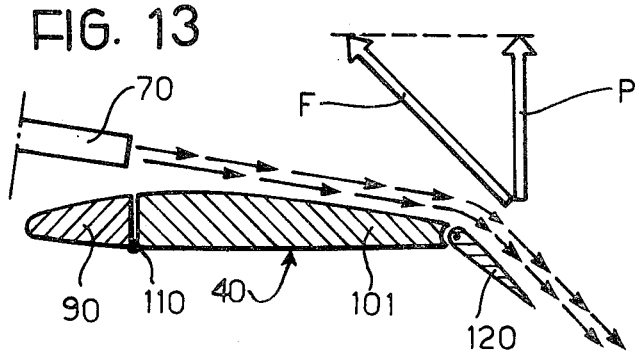

Referring to FIG. 13, which corresponds to a section taken along the line XIII—XIII of FIG. 10, the jet emerging from each nozzle 70 follows the curve of the top surface of the main plane 40 giving rise to additional lift as a result of supercirculation induced on the wing and is thus deflected downwards, by the Coanda effect, immediately downstream of the wing. The deflected jet produces an aerodynamic force F the vertical component P of which constitutes the lift component due to deflection of the jet.

Thanks to the presence of the two longitudinal surfaces 8, the area adjacent the top surface of the wing between each of these surfaces and the fuselage acts as a single surface ejector system in which the primary fluid consists of the jet, the secondary fluid consists of the relative air flow over the wing and in which the successive zones of expansion mixing and recompression of the ejector are defined by a single active surface, consisting of the top surface of the wing. The ejector effect makes it possible to produce an increase in the jet thrust which is transformed into an increase in the aerodynamic force F due to the deflected jet.

Figure 12:
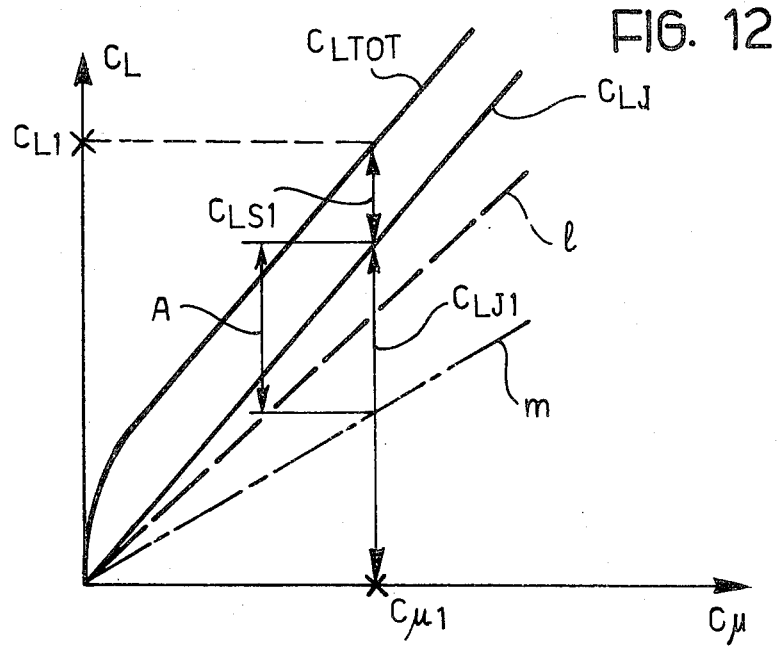
FIGS. 12 to 14 illustrate the principle of operation of the aircraft in FIG. 10.

This phenomenon is further illustrated in the diagram of FIG. 12. In this diagram, the line shown as $C_{L TOT}$ shows the total value of the coefficient of wing lift $C_L$ as a function of the value of the blowing coefficient $C\mu$ (proportional to the thrust of the jet). For a value $C\mu i$ of the blowing coefficient $C\mu$ the total lift coefficient is the sum of a lift coefficient $C_{LJI}$ (corresponding to the lift component due to deflection of the jet) and of a coefficient $C_{LSI}$ (corresponding to the lift component due to the supercirculation induced over the wing).

If the thrust of the jet were to be deflected in the vertical direction, in the absence of an ejector effect, the lift component due to the deflected jet should be shown by the straight line l (inclined at 45° to the axes of reference). In real conditions, in the absence of the ejector effect, the lift component due to the deflected jet would be shown by the line m. The distance indicated A is thus representative of the increase in lift which is produced by the ejector effect with a jet blowing coefficient equal to $C\mu i$.

The diagram in FIG. 12 illustrates clearly that upon increase in the thrust of the jet ($C\mu$), that component of the lift due to the deflected jet becomes preponderant in relation to the remaining component of lift.

Given that the part of the aerodynamic field affected by the deflected jet is concentrated in a limited area adjacent the trailing edge of the wing, there follows from this the possibility of controlling the direction of the aerodynamic resultant F due to the deflected jet by varying the orientation of that part of the wing adjacent to the trailing edge. This result is produced in the aircraft in FIG. 10, thanks to the special structure and arrangement of the parts which are described below.

Referring to FIGS. 10, 11 and 13, 14, each of the two main planes 40 of the aircraft 100 has a fixed front part 90, which occupies a lesser portion than the wing chord (in the example shown, about 20%) and a movable rear part 101, which occupies the larger position of the wing chord. The movable part 101 is articulated to the fixed part 90 of the wing about a substantially transverse axis 110 so that it can be inclined downwards (see FIGS. 11,14) relative to the fixed part 90.

Moreover, the part of each main plane 40 comprised between the respective longitudinal surface 80 and the fuselage is provided, in correspondence with its trailing edge, with a movable control surface 120.

For a given position of the movable part 101 of the wing, a variation of inclination of the movable control surface 120 allows a corresponding variation of the inclination of the aerodynamic resultant F. A variation of the downward inclination of the movable part 101 of the wing, on the other hand, allows the aerodynamic resultant F to be displaced while maintaining its inclination substantially constant.

FIG. 13 illustrates, diagrammatically, a section of the wing with the movable part 101 in the position of nil inclination.

Figure 14:
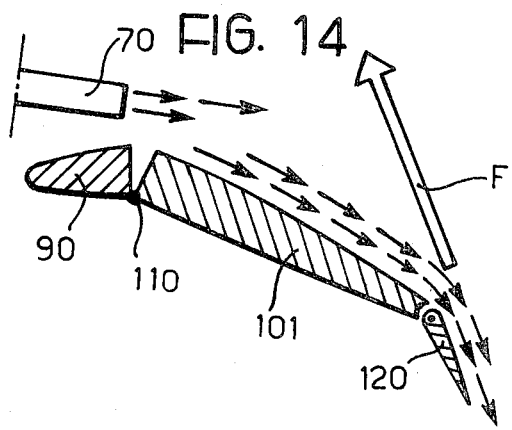

FIG. 14 illustrates, on the other hand, the movable part 101 in its position of maximum downward inclination.

While the movable part 101 of the wing is designed to be controlled by the pilot of the aircraft according to the criteria which will be referred to later, the movable control surface 120 is controlled automatically in dependence upon the output signal of a sensor device designed to detect variations in the direction of the relative air flow in a determined flight attitude.

In the embodiment which is illustrated in FIGS. 10 to 14, this sensor consists of the horizontal flat tailplane 60, the structure of which is free to travel in its entirety in a vertical direction.

In FIG. 11 there is illustrated by way of example, a simplified form of support of the horizontal flat tailplane 60, consisting of a support rod 130 articulated to the structure of the aircraft by means of an articulated parallelogram including two levers 140.

In the example illustrated, the movable tailplane 60 which acts as a sensor is connected to the movable control surfaces 120 by means of a mechanical transmission 150, whereby it also acts as an actuator member of these movable control surfaces. FIG. 11 illustrates a simplified example of a transmission, including a rod 160 articulated at one end to an arm 170 of the lever 140 and at the opposite end to an arm 180 fixed to the movable control surface 120.

When the aircraft is in a determined flight attitude, any possible variations in the direction of the relative air flow induce vertical travel of the horizontal tailplane 6, which consequently controls, via the mechanical transmission 15, the movable control surfaces 12 in such manner as to maintain the attitude of the aircraft unchanged.

In one variant, the movable tailplane 60 is connected to a servo control system (hydraulic, pneumatic or electric) of the movable control surfaces 120.

In another variant, the means for sensing variations in the direction of the relative air flow consist of a sensor of the inertial type connected to the said servo control system of the movable control surfaces 120.

The downward inclination of the movable part 101 of the wing is controlled by the pilot when the aircraft is in conditions in which it is necessary to have a high lift and a certain drag. A typical example of a condition of this kind is landing.

The maximum angle of deviation downwards for the movable part of the wing is between 20° and 30°.

Since the end areas of the wing 30 situated outside the two longitudinal surfaces 80 cannot make use of the jet propulsion to control the boundary layer, it is necessary to provide in correspondence with the leading edge of these end areas movable surfaces 190 for controlling the boundary layer (of the kind known as "slats" by technicians in this field) with the object of avoiding detachment of the boundary layer when the movable part of the wing reaches significant angles of inclination.

When the aircraft is in conditions in which it is necessary to have a high lift and a small drag (e.g. during take-off and in low altitude flight) the movable part 101 of the wing is maintained at intermediate angles of inclination.

The inclination of the movable part 101 is totally nullified during high speed flight.

What is claimed is:

1. An aircraft having a wing and jet propulsion means for directing jets over the top surface of the wing to provide additional lift as a result of the supercirculation over the wing wherein said jets have a flattened and widened configuration above the top surface of the wing comprising nozzles on said jet propulsion means from which the jets emerge being located substantially in longitudinal correspondence with the leading edge of the wing and being vertically spaced above said wing and two longitudinal surfaces projecting from said top surface of the wing and being spaced from each other by a distance substantially corresponding to the width of said jets over the wing to define a single active surface portion of said top surface of said wing and to form a single surface ejector system having a primary fluid consisting of the jets and a secondary fluid consisting of the relative air flow over said active surface of the wing, wherein successive zones of expansion, mixing, and recompression of said ejector system are defined by said single active surface and said jets are directed closely adjacent to the trailing edge of the wing so that the jets are deflected downwardly immediately downstream of the wing by virtue of the Coanda effect.

2. Aircraft as defined in claim 1, wherein said nozzles are provided with means for generating vorticity in said jets, so as to ensure mixing between the jets and the relative air flow over the wing surface portion.

3. Aircraft as defined in claim 1, wherein the propulsion means direct said jets against the top surface of the wing, so that they assume a flattened and widened shape due to contact with the top surface of the wing.

4. Aircraft as defined in claim 1, wherein the propulsion means direct said jets so that they do not impinge against the top surface of the wing, said propulsion means having laterally widened discharge nozzles from which the jets emerge with a flattened and widened shape.

5. Aircraft as defined in claim 1, having a conventional configuration with two main planes, a single fuselage, and two jet propulsion units, each one above a respective main plane, wherein the two longitudinal surfaces are borne respectively by the two main planes and are substantially parallel to the longitudinal plane of symmetry of the aircraft.

6. Aircraft as defined in claim 1, having a configuration with a double fuselage and wing which includes a centre section interconnecting the two fuselages, wherein the jets are directed over said centre section and the said longitudinal surfaces comprise the two fuselages.

7. Aircraft as defined in claim 5, wherein each of the longitudinal surfaces is situated on the respective main plane intermediate the fuselage and the free end of said main plane, at a position such that the centre of pressure of the entire main plane and the centre of pressure of the portion of the main plane between the fuselage and said longitudinal surface are in longitudinal coincidence with each other.

8. Aircraft as defined in claim 7, having a main delta wing and a secondary wing of the canard type placed in front of the main wing, wherein the jet propulsion units have nozzles arranged in correspondence with the trailing edge of the secondary wing, said nozzles having means for varying the direction of the jets.

9. Aircraft as defined in claim 1, wherein the wing of the aircraft has a fixed front part which occupies a lesser portion of the wing chord and a movable rear part which occupies a larger portion of the wing chord and which is articulated to the fixed part about a substantially transverse axis and is inclinable downwards in relation to said fixed part, wherein the part of the wing between the two said longitudinal surfaces is provided at its trailing edge with a movable surface for controlling the attitude of the aircraft, and wherein the aircraft further comprises sensor means adapted to detect variations in the direction of the relative air flow in a determined attitude of flight, and actuator means adapted to control said movable control surface in dependence upon the output signal from the sensor means to maintain unaltered the attitude of the aircraft.

10. Aircraft as defined in claim 9 wherein the sensor means consist of an auxiliary movable surface.

11. Aircraft as defined in claim 10, including a mechanical transmission connecting the auxiliary movable surface to the said movable control surface so that said auxiliary movable surface also serves as the actuator means of the movable control surface.

12. Aircraft as defined in claim 10, wherein the auxiliary movable surface is constituted by the horizontal tailplane of the aircraft, which is displaceable vertically.

13. An aircraft as defined in claim 11 wherein said mechanical transmission connecting the auxiliary moveable surface to said moveable control surface includes a parallelogram linkage allowing vertical displacement of said auxilliary moveable surface while maintaining the latter in its horizontal attitude.

* * * * *